United States Patent
Wu et al.

(10) Patent No.: US 8,625,683 B2
(45) Date of Patent: Jan. 7, 2014

(54) SERIAL DATA TRANSMISSION SYSTEM AND METHOD

(75) Inventors: Zhaolei Wu, Chengdu (CN); Lei Li, Chengdu (CN)

(73) Assignee: IPGoal Microelectronics (SiChuan) Co., Ltd., Chengdu, Sichuan Province (CN)

( * ) Notice: Subject to any disclaimer, the term of this patent is extended or adjusted under 35 U.S.C. 154(b) by 0 days.

(21) Appl. No.: 13/473,756

(22) Filed: May 17, 2012

(65) Prior Publication Data
US 2013/0077702 A1  Mar. 28, 2013

(30) Foreign Application Priority Data
Sep. 22, 2011 (CN) .......................... 2011 1 0282440

(51) Int. Cl.
*H04L 27/00* (2006.01)

(52) U.S. Cl.
USPC ........... 375/259; 375/297; 375/316; 375/220; 327/61; 327/62; 327/108; 327/185; 327/229; 327/335; 327/564; 327/595; 327/65; 327/60; 327/59

(58) Field of Classification Search
USPC ............. 327/61, 62, 108, 185, 229, 335, 564, 327/595, 65, 60, 59; 375/259, 297, 316, 375/257, 220
See application file for complete search history.

(56) References Cited

U.S. PATENT DOCUMENTS 8,035,424 B2 * 10/2011 Komatsu et al. .............. 327/108

* cited by examiner

*Primary Examiner* — Daniel Washburn
*Assistant Examiner* — Rahel Guarino

(57) ABSTRACT

A serial data transmission system, includes a transmitting terminal for transmitting a data, a receiving terminal for receiving the data transmitted by the transmitting terminal, a first connecting capacitor connected between the transmitting terminal and the receiving terminal, and a second connecting capacitor connected between the transmitting terminal and the receiving terminal, wherein the transmitting terminal comprises a transmitting terminal driver unit and an amplitude detection unit connected with the transmitting terminal driver unit, the transmitting terminal driver unit outputs a pair of differential signals, the amplitude detection unit detects an amplitude variation of the differential signals output by the transmitting terminal driver unit, and outputs an indication signal indicating whether the transmitting terminal and the receiving terminal are properly connected with each other. A serial data transmission method is further provided.

9 Claims, 4 Drawing Sheets

SERIAL DATA TRANSMISSION SYSTEM AND METHOD

BACKGROUND OF THE PRESENT INVENTION

1. Field of Invention

The present invention relates to a data transmission system and method, and more particularly to a serial data transmission system having an amplitude detection unit and its method.

2. Description of Related Arts

In a serial data transmission system, when performing a high-speed data transmission, a transmitting terminal of an electronic device needs to detect whether a receiving terminal of an opposite side is properly connected with the transmitting terminal of the electronic device. And the high-speed data transmission is not capable of being started until the transmitting terminal of the electronic device detects that the receiving terminal of the opposite side is properly connected with the transmitting terminal of the electronic device.

Thus, it is required that the transmitting terminal of the electronic device has a detection circuit which is capable of detecting whether the receiving terminal is properly connected. In a serial data transmission system, due to great changes of a peripheral circuit, especially due to the existing of an AC coupling device in a plate pathway, a parasitic circuit in the plate, and factors such as an uncertain resistance designing in the receiving terminal, when a detection circuit is designed, the system is required to have a high anti jamming capability, accurate judgment range, and power consumption thereof is required to be as less as possible, so as to meet the demand of low power consumption in the development of future.

SUMMARY OF THE PRESENT INVENTION

In view of the descriptions mentioned above, it is necessary to provide a serial data transmission system having a simple structure, a strong anti-interference ability, a low power consumption, and comprising an amplitude detection unit thereof, and its method.

A serial data transmission system, comprises a transmitting terminal for transmitting data, a receiving terminal for receiving the data transmitted by the transmitting terminal, a first connecting capacitor connected between the transmitting terminal and the receiving terminal, and a second connecting capacitor connected between the transmitting terminal and the receiving terminal, wherein the transmitting terminal comprises a transmitting terminal driver unit, and an amplitude detection unit connected with the transmitting terminal driver unit, the transmitting terminal driver unit outputs a pair of differential signals, the amplitude detection unit detects an amplitude variation of the differential signals output by the transmitting terminal driver unit, and outputs an indication signal indicating whether the transmitting terminal and the receiving terminal are properly connected with each other.

A serial data transmission method, for transmitting differential data received by a transmitting terminal to a receiving terminal, comprises the following steps of:

receiving a pair of differential data by the transmitting terminal;

switching on an amplitude detection unit in the transmitting terminal;

according to the received differential data, outputting a pair of differential signals to an amplitude detection circuit in the amplitude detection unit by a transmitting terminal diver unit in the transmitting terminal;

detecting an amplitude variation of the received differential data, and outputting a detecting voltage, which is proportional to a voltage that the received differential data are deviating from the common-mode voltage, to a non-inverting input terminal of a comparator in the amplitude detection unit, by the amplitude detection circuit;

inputting a reference voltage to an inverting input terminal of the comparator by a reference voltage terminal;

outputting an indication signal which indicates whether the transmitting terminal and the receiving terminal is properly connected, by an outputting terminal of the comparator; and transmitting the received differential data to the receiving terminal by the transmitting terminal, if the transmitting terminal and the receiving terminal are properly connected with each other.

Compared with conventional arts, the serial data transmission system and method of the present invention detect the amplitude variation generated by the transmitting terminal during data transmitting, generate a detecting voltage, which is proportional to the amplitude variation generated during data transmitting, and compare the detecting voltage with the reference voltage to detect whether the transmitting terminal and the receiving terminal are properly connected with each other, via the amplitude detection unit. The serial data transmission system and method of the present invention have a simple structure, a strong anti-interference ability and low power consumption.

These and other objectives, features, and advantages of the present invention will become apparent from the following detailed description, the accompanying drawings, and the appended claims.

DETAILED DESCRIPTION OF THE PREFERRED EMBODIMENT

Figure 1:
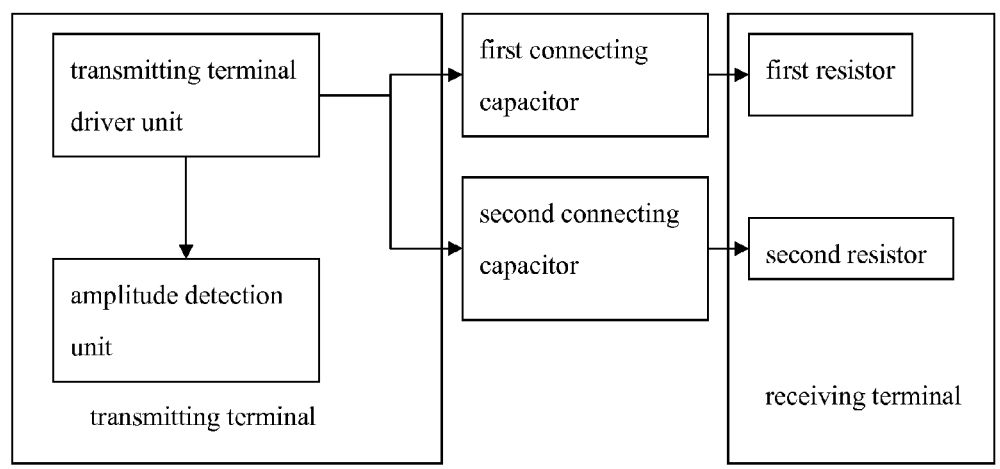
FIG. 1 is a system frame diagram of a serial data transmission system according to a preferred embodiment of the present invention.
Figure 3:
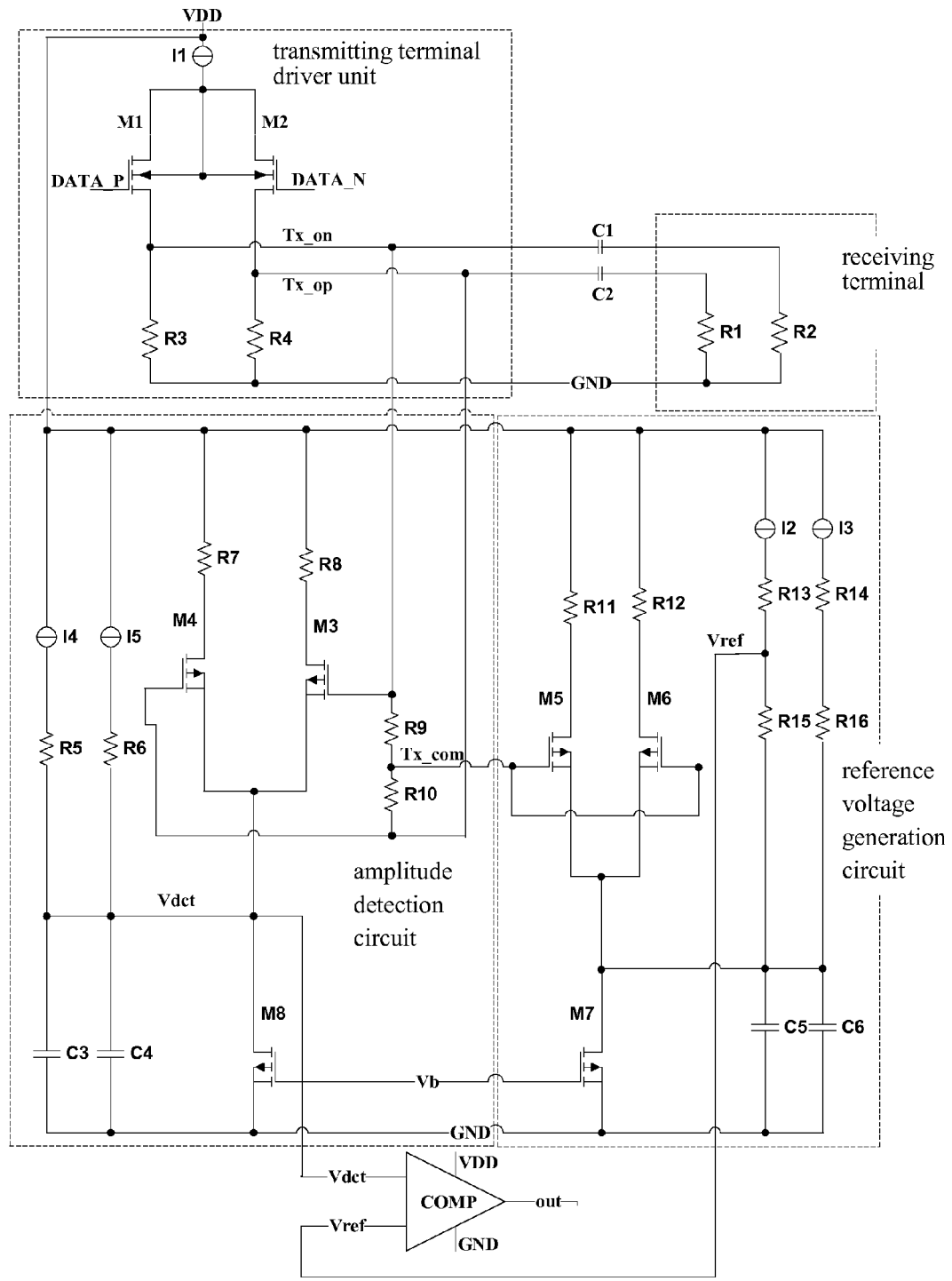
FIG. 3 is a specific circuit diagram of the serial data transmission system according to the preferred embodiment of the present invention.

Referring to FIG. 1 and FIG. 3 of the drawings, a serial data transmission system according to a preferred embodiment of the present invention, comprises a transmitting terminal, a receiving terminal, a first connecting capacitor C1 connected between the transmitting terminal and the receiving terminal, and a second connecting capacitor C2 connected between the transmitting terminal and the receiving terminal, wherein the transmitting terminal comprises a transmitting terminal driver unit and an amplitude detection unit connected with the transmitting terminal driver unit, the receiving terminal comprises a first resistor R1 and a second resistor R2 which are connected in parallel.

The transmitting terminal driver unit outputs a pair of differential signals tx_on and tx_op, according to a data signal received. The amplitude detection unit detects an amplitude variation of the signals tx_on and tx_op which are output by the transmitting terminal driver unit, and outputs an indication signal indicating whether the transmitting terminal and the receiving terminal are properly connected with each other. Both the first connecting capacitor C1 and the second connecting capacitor C2 are AC coupling capacitors for isolating DC signals and allowing only AC signals to pass through. The first resistor R1 and the second resistor R2 are load impedances of the receiving terminal. Both the resistor R1 and the resistor R2 are connected with ground.

Figure 2:
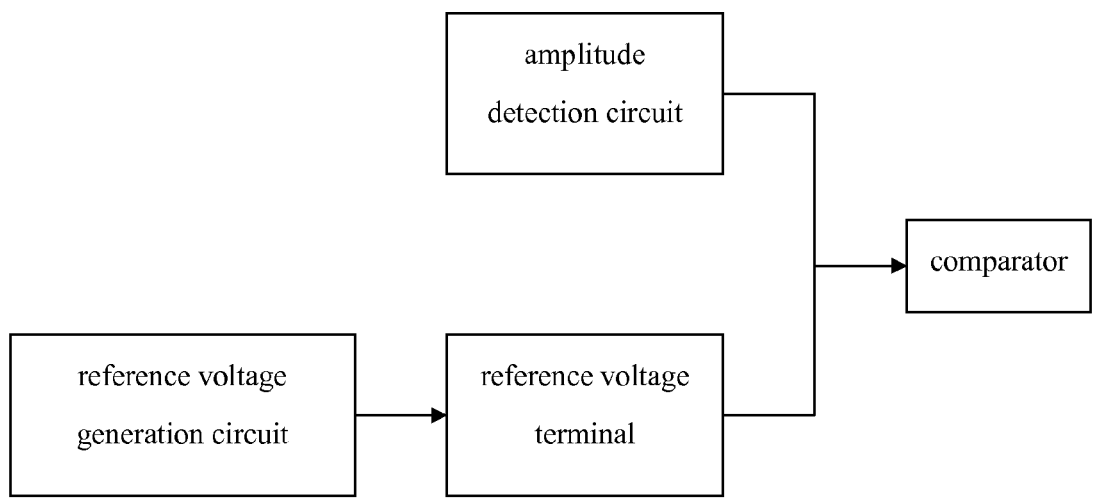
FIG. 2 is a system block diagram of an amplitude detection unit of the serial data transmission system according to the preferred embodiment of the present invention.

Referring to FIG. 2 of the drawings, which is a system block diagram of the amplitude detection unit of the serial data transmission system according to the preferred embodiment of the present invention, and further referring to FIG. 3 of the drawings, the amplitude detection unit comprises an amplitude detection circuit, a reference voltage generation circuit, a reference voltage terminal Vref connected with the reference voltage generation terminal, and a comparator COMP respectively connected with the amplitude detection circuit and the reference voltage terminal Vref, the amplitude detection circuit is for detecting an amplitude variation of differential signals output by the transmitting terminal driver circuit, and outputting a voltage which is proportional to the amplitude variation of the differential signals to the comparator COMP, the reference voltage generation circuit is for generating a required reference voltage to the reference voltage terminal Vref, the comparator COMP is for comparing the voltage output by the amplitude detection circuit with a voltage at the reference terminal in size, and outputs the indication signal indicating whether the transmitting terminal and the receiving terminal are properly connected with each other.

Referring to FIG. 3, which is a specific circuit diagram of the serial data transmission system according to the preferred embodiment of the present invention, the transmitting terminal driver unit comprises a first current source I1, a first field effect transistor (FET) M1 connected with the first current source I1, a second FET M2 connected with the first current source I1, a third resistor R3 connected with the first FET M1, and a fourth resistor R4 connected with the second FET M2; the amplitude detection circuit comprises a fourth current source I4, a fifth current source I5, a third FET M3, a fourth FET M4, an eighth FET M8, a fifth resistor R5, a sixth resistor R6, a seventh resistor R7, an eighth resistor R8, a ninth resistor R9, a tenth resistor R10, a third capacitor C3, and a fourth capacitor C4; and the reference voltage generation circuit comprises a second current source I2, a third current source I3, a fifth FET M5, a sixth FET M6, a seventh FET M7, an eleventh resistor R11, a twelfth resistor R12, a thirteenth resistor R13, a fourteenth resistor R14, a fifteenth resistor R15, a sixteenth resistor R16, a fifth capacitor C5, and a sixth capacitor C6.

According to the preferred embodiment of the present invention, specific circuit connections of the serial data transmission system are as follows. A first terminal of the first current source I1, a first terminal of the second current source I2, a first terminal of the third current source I3, a first terminal of the fourth current source I4, a first terminal of the fifth current source I5, a first terminal of the seventh resistor R7, a first terminal of the eighth resistor R8, a first terminal of the eleventh resistor R11, and a first terminal of the twelfth resistor R12 are all connected with a source terminal VDD. Both a source electrode of the first FET M1 and a source electrode of the second FET M2 are connected with a second terminal of the first current source I1, both a gate electrode of the first FET M1 and a gate electrode of the second FET M2 receive a pair of input differential data DATA_P and DATA_N, a drain electrode of the first FET M1 is respectively connected with a first terminal of the third resistor R3, a first terminal of the first connecting capacitor C1, a gate electrode of the third FET M3, and a first terminal of the ninth resistor R9, a drain electrode of the second FET M2 is respectively connected with a first terminal of the fourth resistor R4, a first terminal of the second connecting capacitor C2, a gate electrode of the fourth FET M4, and a first terminal of the tenth resistor R10, both a drain electrode of the first FET M1 and a drain electrode of the second FET M2 output the pair of differential signals Tx_on and Tx_op to the gate of the third FET M3 and the gate of the fourth FET M4. A second terminal of the first connecting capacitor C1 is connected with a first terminal of the second resistor R2, a second terminal of the second connecting capacitor C2 is connected with a first terminal of the first resistor R1. A drain electrode of the third FET M3 is connected with a second terminal of the eighth resistor R8, a drain electrode of the fourth FET M4 is connected with a second terminal of the seventh resistor R7, a source electrode of the third FET M3, a source electrode of the fourth FET M4, a drain electrode of the eighth FET M8, a first terminal of the fifth resistor R5, a first terminal of the sixth resistor R6, a first terminal of the third capacitor C3, and a first terminal of the fourth capacitor C4 are all connected with a voltage detection terminal Vdct. A second terminal of the fifth resistor R5 is connected with a second terminal of the fourth current source I4, a second terminal of the sixth resistor R6 is connected with a second terminal of the fifth current source I5. Both a second terminal of the ninth resistor R9 and a second terminal of the tenth resistor R10 are connected with a gate electrode of the fifth FET M5 and a gate electrode of the sixth FET M6, and a common-mode signal Tx_com is output to the gate electrode of the fifth FET M5 and the gate electrode of the sixth FET M6. A drain electrode of the fifth FET M5 is connected with a second terminal of the eleventh resistor R11, a drain electrode of the sixth FET M6 is connected with a second terminal of the twelfth resistor R12. A source electrode of the fifth FET M5, a source electrode of the sixth FET M6, a drain electrode of the seventh FET M7, a first terminal of the fifteenth resistor R15, a first terminal of the sixteenth resistor R16, a first terminal of the fifth capacitor C5, and a first terminal of the sixth capacitor C6 are all connected with each other. A gate electrode of the seventh FET M7 is connected with a gate electrode of the eighth FET M8, both the gate electrode of the seventh FET M7 and the gate electrode of the eighth FET M8 are connected with a voltage terminal Vb. A first terminal of the thirteenth resistor R13 is connected with a second terminal of the second current source I2, a first terminal of the fourteenth resistor R14 is connected with a second terminal of the third circuit current I3, both a second terminal of the thirteenth resistor R13 and a second terminal of the fifteenth resistor R15 are connected with the reference voltage terminal Vref, and a second terminal of the fourteenth resistor R14 is connected with a second terminal of the sixteenth resistor R16. A second terminal of the first resistor R1, a second terminal of the second resistor R2, a second terminal of the third resistor R3, a second terminal of the fourth resistor R4, a second terminal of the third capacitor C3, a second terminal of the fourth capacitor C4, a second terminal of the fifth capacitor C5, a second terminal of the sixth capacitor C6, a source electrode of the seventh FET M7, and a soured electrode of the eighth FET M8 are all connected with a ground terminal GND. A non-inverting input terminal of the comparator COMP is connected with the voltage detection terminal Vdct, an inverting input terminal of the comparator is connected with the reference voltage terminal Vref, an output terminal OUT of the comparator outputs an indicating signal that indicates whether the transmitting terminal and the receiving terminal are properly connected with each other. A voltage terminal of the comparator COMP is connected with the source terminal VDD, a second terminal of the comparator COMP is connected with the ground terminal GND.

Working principles of the serial data transmission system according to a preferred embodiment of the present invention are as follows.

Referring to FIG. 3 of the drawings, the differential data DATA_P and DATA_N are serial data which are required to be transmitted by the transmitting terminal. When switching on the amplitude detection unit, the differential data DATA_P and DATA_N are data to be detected with a certain frequency, and the frequency thereof is capable of being regulated according to a designing requirement.

If the amplitudes output by the differential signals Tx_on and Tx_op are respectively as following:

$$V_{Tx\_on}=V_{Tx\_com}+\Delta V, V_{Tx\_op}=V_{Tx\_com}-\Delta V;$$

the common-mode voltage thereof is $V_{Tx\_com}$, $$V_{Tx\_com} = \frac{1}{2}I1 \times R4,$$

wherein $\Delta V$ is a voltage that the differential data Tx_on and Tx_op are deviating from the common-mode voltage, i.e., an amplitude of the signal output by the transmitting terminal.

At this moment, sum of currents that flows through the third FET M3 and the fourth FET M4 is as following:

$$I_{M3}+I_{M4}=K(V_{Tx\_op}-V_{dct}-V_{th})^2+K(V_{Tx\_on}-V_{dct}-V_{th})^2=K(V_b-V_{th})^2-I_4-I_5,$$

from the equation mentioned above, a formula that indicates a variation of a voltage value Vdct at the voltage detection terminal Vdct with $\Delta V$ is obtained:

$$V_{dct} \approx \frac{(V_{th} - V_{Tx\_com}) + \sqrt{(V_{th} - V_{Tx\_com})^2 + 4\Delta V}}{2},$$

$$V_{dct} \infty \Delta V,$$

i.e., the voltage value Vdct at the voltage detection terminal Vdct is proportional to the voltage value $\Delta V$ that the differential data Tx_on and Tx_op are deviating from the common-mode voltage, wherein K is a proportional coefficient, $$K = \frac{1}{2}\mu C_{ox}\frac{W}{L},$$

μ is a mobility of a process of an FET, Cox is a gate oxide thickness of the process of the FET, $$\frac{W}{L}$$

is a width to length ratio of the third FET M3 and the fourth FET M4, Vth is a threshold voltage of the FET.

It can be seen from the formula mentioned above that the voltage value Vdct at the voltage detection terminal Vdct increases with an increasing of the voltage value $\Delta V$ that the differential data Tx_on and Tx_op are deviating from the common-mode voltage.

Assuming that when the transmitting terminal detects that the transmitting terminal and the receiving terminal are properly connected with each other, the voltage value that the differential signals Tx_on and Tx_op are deviating from the common-mode voltage is $\Delta V1$, the voltage value detected at the voltage terminal Vdct is Vdct1; and that when the transmitting terminal detects that the transmitting terminal and the receiving terminal are not properly connected with each other, the voltage value that the differential signals Tx_on and Tx_op are deviating from the common-mode voltage is $\Delta V2$, the voltage value detected at the voltage terminal Vdct is Vdct2, when the transmitting terminal detects that the transmitting terminal and the receiving terminal are properly connected with each other, $$\Delta V1 = \frac{1}{2}I1 \times \frac{R1 \times R4}{R1 + R4};$$

when the transmitting terminal detects that the transmitting terminal and the receiving terminal are not properly connected with each other, $$\Delta V2 = \frac{1}{2}I1 \times R4;$$

$\Delta V1 < \Delta V2$, so Vdct1 < Vdct2.

In order to distinguish the two cases mentioned above, a reference voltage value Vref generated by the reference voltage generation circuit is set between $\Delta V1$ and $\Delta V2$.

when the transmitting terminal detects that the transmitting terminal and the receiving terminal are properly connected with each other, Vdct<Vref, i.e., an output at the output terminal of the comparator is at low level;

when the transmitting terminal detects that the transmitting terminal and the receiving terminal are not properly connected with each other, Vdct>Vref, i.e., the output at the output terminal of the comparator is at high level.

It can be seen from the descriptions mentioned above that whether the transmitting terminal and the receiving terminal are properly connected with each other is capable of being detected, by a level of signal output by the transmitting terminal of the comparator.

Figure 4:
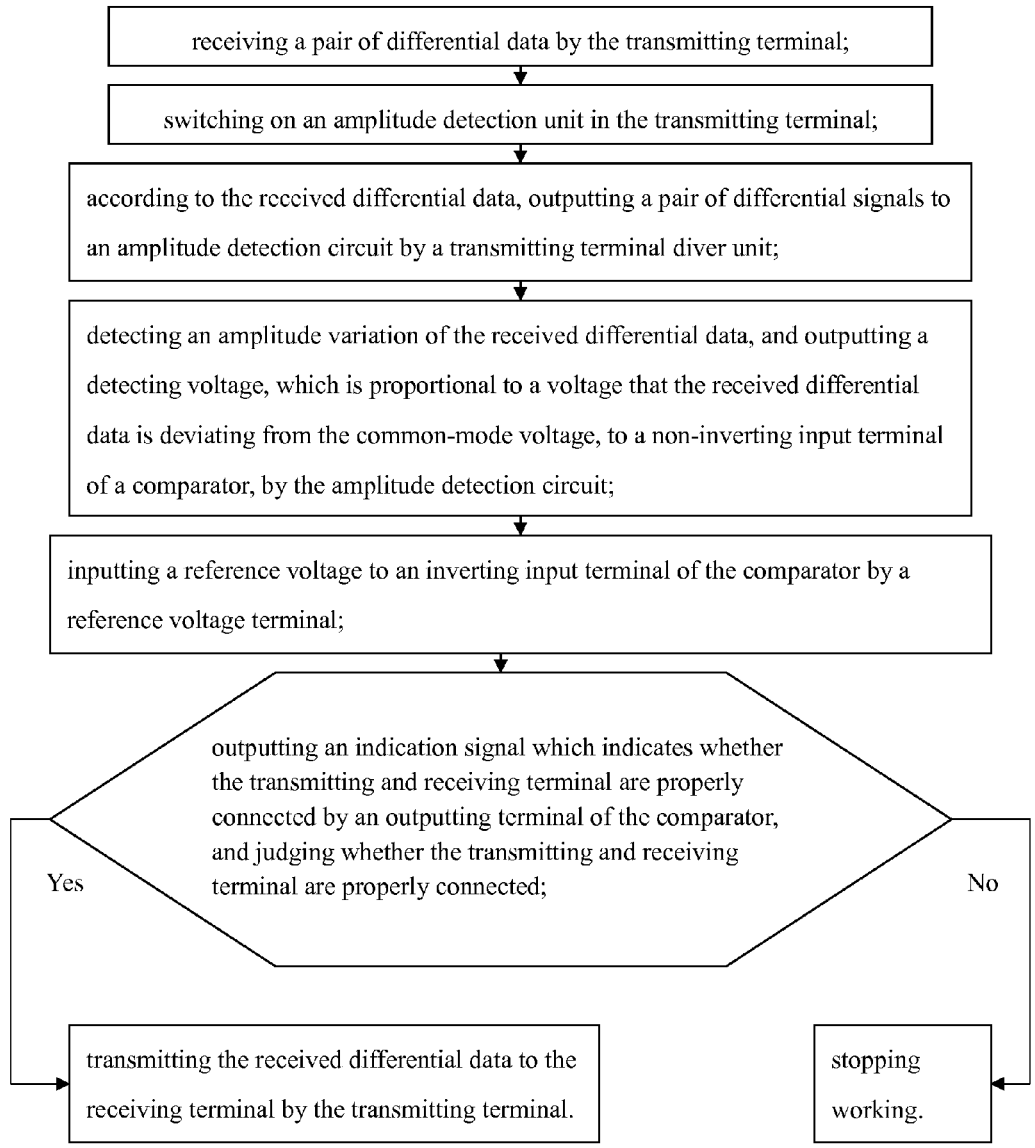
FIG. 4 is a flow chart of a serial data transmission method according to a preferred embodiment of the present invention.

Referring to FIG. 4 of the drawings, a serial data transmission system according to a preferred embodiment of the present invention comprises:

step 1 of, receiving a pair of differential data DATA_P and DATA_N by the transmitting terminal, wherein the pair of differential data DATA_P and DATA_N are serial data that requires the transmitting terminal to transmit;

step 2 of, switching on an amplitude detection unit in the transmitting terminal, wherein at this moment, the differential data DATA_P and DATA_N are data to be detected with a certain frequency, and the frequency thereof is capable of being regulated according to a designing requirement;

step 3 of, according to the differential data DATA_P and DATA_N received, outputting a pair of differential signals Tx_on and Tx_op to an amplitude detection circuit in the amplitude detection unit by a transmitting terminal diver unit in the transmitting terminal;

step 4 of, detecting an amplitude variation of the differential data Tx_on and Tx_op received, and outputting a detecting voltage Vdct, which is proportional to a voltage $\Delta V$ that the differential data Tx_on and Tx_op received are deviating from the common-mode voltage, to a non-inverting input terminal of a comparator in the amplitude detection unit, by the amplitude detection circuit;

step 5 of, generating a reference voltage to the reference voltage terminal Vref by a reference voltage generation circuit, wherein the reference voltage terminal Vref inputs the reference voltage to an inverting input terminal of the comparator;

step 6 of, outputting an indication signal which indicates whether the transmitting terminal and the receiving terminal are properly connected with each other by an outputting terminal of the comparator; and judging whether the transmitting terminal and the receiving terminal are properly connected with each other; and step 7 of, transmitting the differential data DATA_P and DATA_N received to the receiving terminal by the transmitting terminal, if the transmitting terminal and the receiving terminal are properly connected with each other; stopping working if the transmitting terminal and the receiving terminal are not properly connected with each other.

In the serial data transmission system and method of the present invention, the amplitude detection unit detects the amplitude variation generated by the transmitting terminal during data transmitting, i.e., a voltage value that the differential data Tx_on and Tx_op are deviating from the common-mode voltage; generates a detecting voltage, which is proportional to the amplitude variation generated during data transmitting; and compares the detecting voltage with the reference voltage to detect whether the transmitting terminal and the receiving terminal are properly connected with each other. The serial data transmission system and method of the present invention have a simple structure, a strong anti-interference ability and a low power consumption.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A serial data transmission system, comprising:
a transmitting terminal for transmitting a data, a receiving terminal for receiving the data transmitted by said transmitting terminal, a first connecting capacitor connected between said transmitting terminal and said receiving terminal, and a second connecting capacitor connected between said transmitting terminal and said receiving terminal, wherein said transmitting terminal comprises a transmitting terminal driver unit and an amplitude detection unit connected with said transmitting terminal driver unit, said transmitting terminal driver unit outputs a pair of differential signals, said amplitude detection unit detects an amplitude variation of the differential signals output by said transmitting terminal driver unit, and outputs an indication signal indicating whether said transmitting terminal and said receiving terminal are properly connected with each other,
wherein said amplitude detection unit comprises an amplitude detection circuit, a reference voltage generation circuit, a reference voltage terminal connected with said reference voltage generation terminal, and a comparator respectively connected with said amplitude detection circuit and said reference voltage terminal, said amplitude detection circuit detects an amplitude variation of the differential signals output by said transmitting terminal driver circuit, and outputs a voltage which is proportional to the amplitude variation of the differential signals to said comparator, said comparator compares said voltage output by said amplitude detection circuit with a voltage at said reference terminal in size, and outputs the indication signal indicating whether said transmitting terminal and said receiving terminal are properly connected with each other, said receiving terminal comprises a first resistor and a second resistor connected in parallel.

2. The serial data transmission system, as recited in claim 1, wherein:
said transmitting terminal driver unit comprises a first current source, a first field effect transistor (FET) connected with said first current source, a second FET connected with said first current source, a third resistor connected with said first FET, and a fourth resistor connected with said second FET;
said amplitude detection circuit comprises a fourth current source, a fifth current source, a third FET respectively connected with said first FET and said third resistor, a fourth FET respectively connected with said second FET and said fourth resistor, an eighth FET, a fifth resistor connected with said fourth current source, a sixth resistor connected with said fifth current source, a seventh resistor connected with said fourth FET, an eighth resistor connected with said third FET, a ninth resistor connected with said third FET, a tenth resistor connected with said fourth FET, a third capacitor connected with said fifth resistor, and a fourth capacitor connected with said sixth resistor; and
said reference voltage generation circuit comprises a second current source, a third current source, a fifth FET, a sixth FET connected with said fifth FET, a seventh FET respectively connected with said fifth FET and said sixth FET, an eleventh resistor connected with said fifth FET, a twelfth resistor connected with said sixth FET, a thirteenth resistor connected with said second current source, a fourteenth resistor connected with said third current source, a fifteenth resistor connected with said thirteenth resistor, a sixteenth resistor connected with said fourteenth resistor, a fifth capacitor connected with said fifteenth resistor, and a sixth capacitor connected with said sixteenth resistor.

3. The serial data transmission system, as recited in claim 2, wherein a first terminal of said first current source, a first terminal of said second current source, a first terminal of said third current source, a first terminal of said fourth current source, a first terminal of said fifth current source, a first terminal of said seventh resistor, a first terminal of said eighth resistor, a first terminal of said eleventh resistor, and a first terminal of said twelfth resistor are all connected with a source terminal, both a source electrode of said first FET and a source electrode of said second FET are connected with a second terminal of said first current source, both a gate electrode of said first FET and a gate electrode of said second FET receive a pair of differential data input, a drain electrode of said first FET is respectively connected with a first terminal of said third resistor, a first terminal of said first connecting capacitor, a gate electrode of said third FET, and a first terminal of said ninth resistor, a drain electrode of said second FET is respectively connected with a first terminal of said fourth resistor, a first terminal of said second connecting capacitor, a gate electrode of said fourth FET, and a first terminal of said tenth resistor, and both a drain electrode of said first FET and a drain electrode of said second FET output the pair of differential signals to said gate of said third FET and said gate of said fourth FET.

4. The serial data transmission system, as recited in claim 3, wherein a second terminal of said first connecting capacitor is connected with a first terminal of said second resistor, a second terminal of said second connecting capacitor is connected with a first terminal of said first resistor, a drain electrode of said third FET is connected with a second terminal of said eighth resistor, a drain electrode of said fourth FET is connected with a second terminal of said seventh resistor, a source electrode of said third FET, a source electrode of said fourth FET, a drain electrode of said eighth FET, a first terminal of said fifth resistor, a first terminal of said sixth resistor, a first terminal of said third capacitor and a first terminal of said fourth capacitor are all connected with a voltage detection terminal, a second terminal of said fifth resistor is connected with a second terminal of said fourth current source, a second terminal of said sixth resistor is connected with a second terminal of said fifth current source.

5. The serial data transmission system, as recited in claim 4, wherein both a second terminal of said ninth resistor and a second terminal of said tenth resistor are connected with a gate electrode of said fifth FET and a gate electrode of said sixth FET, and a common-mode signal is output to said gate electrode of said fifth FET and said gate electrode of said sixth FET, a drain electrode of said fifth FET is connected with a second terminal of said eleventh resistor, a drain electrode of said seventh FET, a first terminal of said fifteenth resistor, a first terminal of said sixteenth resistor, a first terminal of said fifth capacitor, and a first terminal of said sixth capacitor are all connected with each other.

6. The serial data transmission system, as recited in claim 5, wherein a gate electrode of said seventh FET is connected with a gate electrode of said eighth FET, both said gate electrode of said seventh FET and said gate electrode of said eighth FET are connected with a voltage terminal, a first terminal of said thirteenth resistor is connected with a second terminal of said second current source, a first terminal of said fourteenth resistor is connected with a second terminal of said third circuit current, both a second terminal of said thirteenth resistor and a second terminal of said fifteenth resistor are connected with said reference voltage terminal, and a second terminal of said fourteenth resistor is connected with a second terminal of said sixteenth resistor.

7. The serial data transmission system, as recited in claim 6, wherein a second terminal of said first resistor, a second terminal of said second resistor, a second terminal of said third resistor, a second terminal of said fourth resistor, a second terminal of said third capacitor, a second terminal of said fourth capacitor, a second terminal of said fifth capacitor, a second terminal of said sixth capacitor, a source electrode of said seventh FET, and a source electrode of said eighth FET are all connected with a ground terminal, a non-inverting input terminal of said comparator is connected with said voltage detection terminal, an inverting input terminal of said comparator is connected with said reference voltage terminal, an output terminal of said comparator outputs an indicating signal that indicates whether said transmitting terminal and said receiving terminal are properly connected with each other.

8. A serial data transmission method, for transmitting differential data received by a transmitting terminal to a receiving terminal, which comprises the following steps of:
   receiving a pair of differential data by the transmitting terminal;
   switching on an amplitude detection unit in the transmitting terminal;
   according to the differential data received, outputting a pair of differential signals to an amplitude detection circuit in the amplitude detection unit by a transmitting terminal driver unit in the transmitting terminal;
   detecting an amplitude variation of the differential data received, and outputting a detecting voltage, which is proportional to a voltage that the differential data received are deviating from the common-mode voltage, to a non-inverting input terminal of a comparator in the amplitude detection unit, by the amplitude detection circuit;
   inputting a reference voltage to an inverting input terminal of the comparator by a reference voltage terminal;
   outputting an indication signal which indicates whether the transmitting terminal and the receiving terminal are properly connected with each other by an outputting terminal of the comparator; and
   transmitting the differential data received to the receiving terminal by the transmitting terminal, if the transmitting terminal and the receiving terminal are properly connected with each other.

9. The serial data transmission method, as recited in claim 8, wherein the differential data received by the transmitting terminal are serial data which require the transmitting terminal to transmit to the receiving terminal, and when switching on the amplitude detection unit, the differential data received by the transmitting terminal are data to be detected with a certain frequency, the frequency thereof is capable of being regulated according to a designing requirement.

* * * * *